Jan. 6, 1942.    J. D. RYAN    2,268,902
PROCESS FOR RECOVERY OF SUCROSE FROM IMPURE SUCROSE SOLUTIONS
Filed May 21, 1938
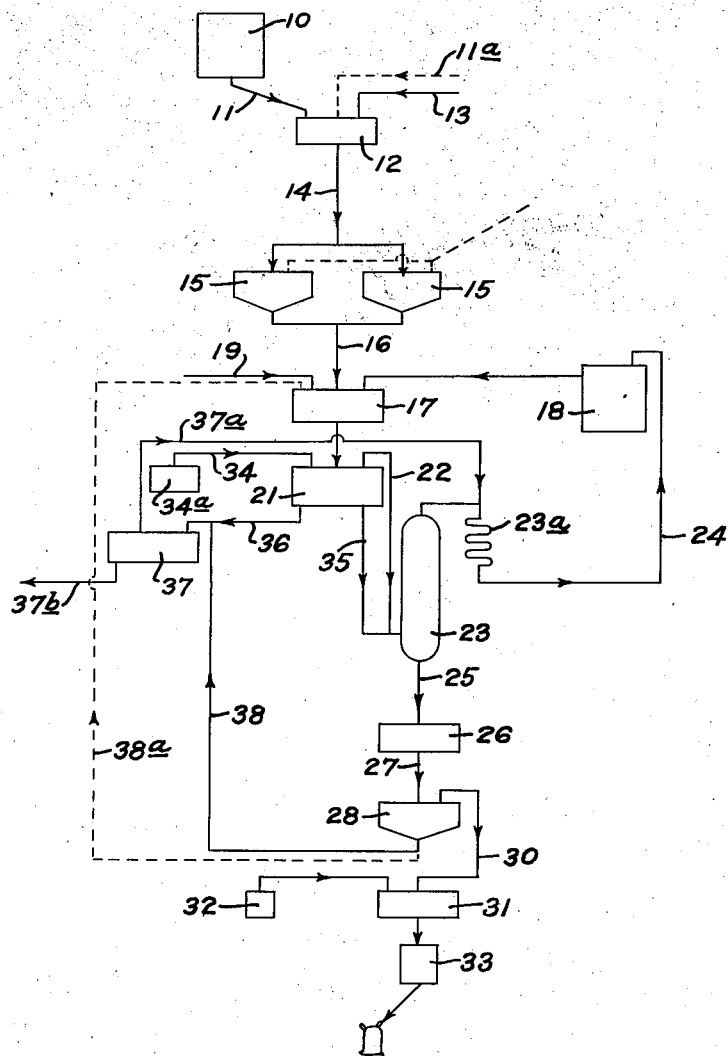
INVENTOR.
JOHN D. RYAN
BY
ATTORNEY Patented Jan. 6, 1942

2,268,902

UNITED STATES PATENT OFFICE 2,268,902

PROCESS FOR RECOVERY OF SUCROSE FROM IMPURE SUCROSE SOLUTIONS

John D. Ryan, Campbell, Calif.

Application May 21, 1938, Serial No. 209,175

2 Claims. (Cl. 127—46)

This invention relates to an improved process for the recovery of sugar, and particularly to the process of recovering sucrose from impure sucrose juices and solutions. The invention has as an object the recovery of sucrose in such form and purity that it may be readily crystallized to commercial standards by practical means with a greater sucrose recovery than has heretofore been obtained.

The present process is not only applicable to the recovery of sucrose from raw sugars but also includes within these sugars all kinds of sucrose bearing syrups regardless of their degree of purity or source.

The present invention also includes within its ambit the various grades of molasses remaining after the customary successive strikes in the extraction of sugar from sugar cane and all other kinds of solutions containing both sucrose and glucose.

It is the object of the present invention to provide a commercial method for the recovery of sucrose from the various forms of sucrose and glucose solutions which in some instances are now run to waste or returned to another point in the process in an effort to extract more of the sucrose content. This latter method not only increases the volume of material handled but lowers the character of the finished sucrose and the percentage of recovery. It is apparent that this procedure entails the circulation of an amount of waste material or impurities from which there can be no recovery of sucrose.

For the purpose of this description and for lucidity of the process and methods herein disclosed, the impure sucrose solution treated by way of illustration will be molasses coming from the plantation treatment of sugar cane in the manufacture of raw sugar. However, it is to be understood that molasses from refinery operations as well as any other impure sucrose solutions containing glucose are equally well adapted for treatment as herein disclosed.

In the conventional operation of plantation raw sugar manufacture, the juice coming from the mill is taken through a heater to a defecating tank, treated with lime solutions and then heated to a sterilizing temperature. This mixture then is run to settling tanks or clarifiers and heated to a break for the precipitation of mineral, organic or other impurities from which the clear juice passes on through the manufacturing process. Ordinarily, the sediment thrown down in the precipitation is sweetened off and the residue run to waste. Such residue is not, of course, again returned for use in any step in the manufacturing process. This sediment, however, contains calcium salts and nitrogenous matter among others, which are valuable as fermenting aids and as food for yeast, and further provides an excess of some of these matters which are likewise beneficial as will hereinafter be disclosed. In accordance with the present disclosure, the sediment thrown down at this point, instead of being sweetened off and disposed of, is pumped directly to the molasses or other impure sucrose solution which is to be treated as disclosed herein. Ordinarily, it has been believed that only clear water should be used to dilute the impure sucrose solution, such as molasses, and the like, in the attempt to get a commercial sucrose recovery from such impure solutions. The particular advantage of using the sediment from the plantation operation as a diluent is directly attributable to the contents of the sediment by which is furnished an ample supply of food for the yeast to speed up their activity which directly speeds up and promotes the fermentation as employed herein. The presence of the sediment in the mixture brings about a faster and more complete conversion.

Another commercial and practical result accomplished by using this sediment as a diluent resides in the fact that the sediment has previously been heated and sterilized and is at a proper temperature and degree of sterility for mixing with the molasses.

With reference to the flow sheet set forth in the drawing which diagrams the operations, and here appended for a better understanding of the process and procedure of the present invention, the sediment or settlings from the plantation operations is shown as entering the system by line 13. The molasses to be treated comes into the system or process from a storage tank 10 through the line 11 or directly from the plantation operation through the line 11a and are together thoroughly mixed in the mixing tank 12. Any amount of sediment up to 25% will accomplish the purpose. The mixture of sediment and molasses has a Brix of about 81° to 87°, and it has been found preferable to bring the mixture to a specific gravity of about 40° to 45° Brix. This may be accomplished by the addition of water, although preferably by the use of sweet water from plantation or refinery operations, if the same is available. During the mixing operation, the mass is cooled to approximately 30° C. which is the accepted temperature for proper fermentation. It is likewise important to control the glucose content of the mixture and preferably it should contain approximately from 10% to 11% glucose.

From the mixing tank the cooled mixture passes by line 14 into the fermentation tank 15 where it is inoculated (15a) with a pure culture of yeast. It is preferred to use a pure culture in order that proper control of the fermentation may be accomplished and the particular yeast for best results should be a pure strain, and preferably one of the members of the *Saccharomyces apiculatus* or *Pseudosaccharomyces apiculatus* groups, although any strain is acceptable which will convert the inverted sugars into alcohol without substantial inversion or effect upon the sucrose. The addition or inoculation of yeast at this point follows the customary practice and is for the purpose of converting the invert sugars in the solution into alcohol by the process of fermentation without any substantial effect upon the sucrose in the solution. The yeast inoculation should be approximately 25% by volume of the mix.

During the fermentation the mix is gently agitated and preferably by aeration so that combined agitation and aeration are accomplished.

It is not always possible in commercial procedure to use an impure sucrose material having a content of glucose which has been sterilized or maintained sterile and likewise, in some operations, it is not practical to use a sterile diluent regardless of whether it is the sediment already referred to, which comes from the raw sugar manufactured, water, or sweet water also from the factory operations. As has been stated, it is preferable to use a pure culture of yeast for the fermentation and obviously if either the impure base material or the diluent is contaminated with wild yeast, the pure culture of the inoculation cannot be expected to maintain its purity and produce the results required. Thus, in spite of careful control, there will be inversion of some of the sucrose. Where it is necessary, therefore, to use mixtures which are contaminated or likely to become contaminated with wild yeast, the mixture is treated with a solution, which is harmless as far as the product is concerned, to destroy the wild yeast strains. Any of the well known disinfectants may be used and a thin solution of "Clorox" accomplishes this end in a satisfactory manner. Where such disinfectants are employed, it is necessary to produce a pure strain of yeast for the inoculation which has been bred in a culture containing the same disinfectant or one of substantially the same properties, so that the strain will have resistance to the presence of the disinfectant in the main mixture and be free to perform its function.

The reason for controlling the percentage of glucose in the mixture is to secure a balance of activity so as to speed up the fermentation rather than retard it. The production of too much alcohol by fermentation at this time not only materially retards the fermentation but prolongs the time required for completing the reaction. From 10% to 11% glucose produces about 5% alcohol and the remaining 5% (approximately) generates and is discharged in the form of carbon dioxide gas. The presence of 5% alcohol is an optimum figure and the accumulation of much more alcohol in the fermenting process will begin to retard the fermentation as well as prolong the time of reaction.

The fermented liquor is taken by line 16 to liming tank 17. At this point the mixture receives a lime solution (19) such as milk of lime, or any other solution of an alkaline earth oxide or hydroxide, of such degree of concentration as will not form a saccharate. The determination of this point may be made by simple well-known control tests at the time of operation. Lime is used preferably because of its availability. The addition of alkaline earth oxide or hydroxide at this point in a solution brings about a reaction at once and a good separation of the mineral and organic impurities among others in the solution. As soon as the lime reaction is substantially complete, the mixture then receives enough 80% alcohol to equal the volume of the ferment. This alcohol is delivered to the tank 17 from the alcohol storage tank 18. The addition of the alcohol immediately stops the fermentation and likewise reacts with other impurities in the solution so that there are two separate purifying reactions taking place successively. As has been stated, it is preferable to have the lime reaction take place prior to the addition of the alcohol in order to have two separations of impurities, although it is practical to add the alcohol first. The addition of the alcohol before the lime brings about a complex reaction and since the alcohol as well as the ferment are acid in reaction a certain amount of the alkalinity reaction is devoted to neutralization of the entire solution and so does not become available for the separation of impurities. Further, it should be stated that the precipitation of impurities includes those added by means of the sediment as well as those in the molasses.

At this stage there is a ready separation of impurities by precipitation, such impurities being minerals, salts, organic materials, and others, which are segregated from the purified liquor by means of the filter press 21. The clear liquor containing the alcohol and sucrose solution is taken by line 22 to the still 23 in which not only the alcohol put into the process but also the accretion due to the fermentation is recovered by well known means and after condensation (23a) is taken to the alcohol storage tank 18 through line 24. The de-alcoholized sucrose and water solution is then conveyed by line 25 to a defecating tank 26. The sucrose and water solution at this point contains the various lime combinations in solution greatly in excess of those usually contained therein because of the original dilution of the molasses with the sediment from the plantation operation and these must be removed in order to secure a commercial high grade sucrose. The solution at this point has a pH of approximately 9 to 12. The solution in the defecating tank is treated with an acid which will precipitate the lime salts and bicarbonates, such as phosphoric acid, and must be present in sufficient quantity to bring a break in the treated solution. Any acid which will bring about the precipitation desired may be used, but it also must be weak enough so as not to invert the sucrose in the solution. The addition of the acid results in the solution having a pH of approximately 7. A well defined precipitation is brought about and the syrup which results will produce satisfactory sucrose crystals.

The nature of the precipitation is such that it may be easily separated by running the liquor into the settling tank 28 by line 27. From this the clear liquor or syrup is run by line 30 to the crystallizing pans 31 where it is supplied with a footing (32) of approximately one-third by volume. This footing is a seed grain of sucrose of higher purity and results in the formation or the growing of substantially larger crystals than have heretofore been recovered, and also aids in the complete or substantially complete extraction of sucrose in the process. As a result of boiling in the crystallizing pans 31 and the subsequent centrifuging at 33, there is approximately a 96% recovery of sucrose as well as the production of a satisfactory high grade good grain commercial product.

In addition to the novel process already outlined, there are certain other and novel steps which contribute to the result and which make the process a commercially practical operation both as to the savings thereof and as to the elimination of waste products.

It has long been recognized that the precipitant created by the liming and alcohol reactions and collecting in the form of a wet cake in the filter press 21 contains a large amount of alcohol, and although many efforts have been made to recover this alcohol, until now commercial operations have failed to recover it satisfactorily. Departing from the ordinary procedure, the filter cake, containing the precipitants, from the filter press 21 is taken to the de-alcoholizer 37 by route 36. This device 37 is preferably a steam jacketed screw conveyor which breaks up the cake as it passes through from beginning to end so that the heat from the steam in the jacket may vaporize the alcohol contained in the cake and which would otherwise be lost. For about half the length of the device 37, there are steam jets for diluting the alcohol vapors collected because the resultant vaporized products are highly explosive. Likewise, for about the same distance at the early portion, the top is vented for collecting the vapors and conveying them via line 37a to the condenser of the still 23 from whence the alcohol recovered is returned to the storage tank 18 by line 24. The remainder of the progress of the cake is drying so that the product leaving the de-alcoholizer 37 is dry in form and easily handled, via line 37b.

Before, however, the precipitants or sediment from the filter press 21 is taken to the de-alcoholizer 37, there is a further recovery of the sucrose which is accomplished. It is likewise a recognized fact that the cake in the filter press 21 contains a considerable portion of the available sucrose recovery in the solution. Prior teachings and operations run this filter cake from the process after making some effort to recover the sucrose and until the present time, no adequate means has been devised for making the recovery of this amount commercially practical. In the present invention, after the main operation of the filter press 21, the press is sweetened with a solution of alcohol and water in substantially equal parts and enough lime added to the solution to bring up the pH of the sweetening solution to that of the clear filtrate. This solution is introduced into the filter press by line 34. The clear sweet water which results after running through the filter press is taken by the line 35 to the still and joins with the clear liquor from the main operation. In the still 23 some of the alcohol used in sweetening the filter press 21 is recovered and the remainder is recovered in the de-alcoholizer 37 so that there should be no substantial loss of alcohol.

Also, as another feature of this process, the sediment or precipitate from the settling tank 28 is again not run to waste but used. Two methods of use are indicated in the flow chart, the preferred course being indicated by the line 38. In accordance with this preferred route, the sediment is taken to the de-alcoholizer 37 and mixed with the precipitate which is in the form of a filter cake from the press 21. In this manner, the resultant product of the de-alcoholizer is particularly valuable as fertilizer because of the presence of an abundance of lime combinations and phosphates, particularly added by the sediment from settling tank 28. The other route is indicated by the broken line 38a and shows that the sediment contains lime and phosphate in such an amount that it may be returned to the supply of materials and used again in the process for addition to the liming tank 17. The excess amounts of such products introduced by the mixing of the original sediment with the molasses makes this possible.

Although the disclosure herein refers to a solution of molasses from plantation operations, it should be remembered that this is for illustration only, and that molasses may likewise come from refinery operations or the impure sucrose solution or syrup may be derived from the source.

I claim:

1. In the process for extracting sucrose from impure solutions the steps of taking impure solutions containing both sucrose and glucose, withdrawing the precipitate from the first settlings of a sugar refining system or a plantation raw sugar system and mixing the same with the said impure solution, bringing the mixture to a concentration of between 40° and 45° Brix, inoculating the mixture with a pure strain of yeast capable of fermenting the invert sugars without any substantial effect upon the sucrose, adding an alkaline earth oxide or hydroxide to the fermented mixture sufficient to precipitate the impurities but insufficient to form a saccharate, adding alcohol in substantially equal volume to the ferment to further precipitate impurities, separating the clear liquor from the precipitated impurities, removing the alcohol, adding an acid to the purified and dealcoholized solution in a sufficient amount to precipitate the salts and bicarbonates of the alkaline earth oxide or hydroxide without inverting the sucrose, separating the sucrose solution from the precipitate, concentrating and crystallizing the sucrose in the presence of a footing of sucrose having a higher purity than the solution.

2. In the process for the extraction of sugar from impure solutions the steps of taking impure solutions containing both sucrose and glucose, adding thereto the precipitate from the first settlings of a sugar refining system or a plantation raw sugar system, cooling the mixture to fermenting temperature, inoculating the mixture with approximately 25% by volume of a pure strain of yeast which will ferment the invert sugar without inverting the sucrose, adding an alkaline earth oxide or hydroxide sufficient to precipitate impurities but insufficient to form a saccharate, adding alcohol to complete the separation, separating the clear liquor from the precipitated impurities, removing the alcohol from the solution, adding an acid to the purified dealcoholized solution which will precipitate the alkaline earth oxide or hydroxide salts and bicarbonates without inverting the sucrose, separating the sucrose solution from the precipitate, adding a footing of sucrose of a higher purity and concentrating and crystallizing the sugar.

JOHN D. RYAN.